(12) United States Patent
Wei et al.

(10) Patent No.: US 9,978,344 B2
(45) Date of Patent: May 22, 2018

(54) APPLICATION/WINDOW AWARE IMAGE CACHING SYSTEM

(71) Applicant: VMware, Inc., Palo Alto, CA (US)

(72) Inventors: Yuping Wei, Beijing (CN); Yong Lin Ma, Beijing (CN); Jinxing Hu, Beijing (CN); Li-Zhu Zhang, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 88 days.

(21) Appl. No.: 14/973,088

(22) Filed: Dec. 17, 2015

(65) Prior Publication Data

US 2017/0178600 A1    Jun. 22, 2017

(51) Int. Cl.
*G09G 5/36* (2006.01)
*G09G 5/393* (2006.01)
*G06F 12/1018* (2016.01)
*G06F 12/0802* (2016.01)

(52) U.S. Cl.
CPC ......... *G09G 5/393* (2013.01); *G06F 12/0802* (2013.01); *G06F 12/1018* (2013.01); *G06F 2212/455* (2013.01); *G09G 2330/021* (2013.01); *G09G 2360/121* (2013.01); *G09G 2360/18* (2013.01)

(58) Field of Classification Search
None
See application file for complete search history.

(56) References Cited

U.S. PATENT DOCUMENTS 9,026,615 B1 * 5/2015 Sirton ..................... H04L 65/60
709/217
2009/0083512 A1 * 3/2009 Godwin ............ G06F 17/30873
711/173

* cited by examiner

*Primary Examiner* — Kyle Zhai
(74) *Attorney, Agent, or Firm* — Patterson & Sheridan LLP (57) ABSTRACT

A method for caching images in a virtual environment uses hash tables to store information about an application or window and to store updated images. Suitable areas of applications or windows are fixed relative to the window for many cases, and also include a relatively small number of possible display statuses. Hash tables are used on an agent side and a client side to track previous image updates. When an updated image is determined to be already stored in a cache, the agent side can transmit a hash identifying the image to the client side, and the client side can update the display with the cached image.

20 Claims, 9 Drawing Sheets

APPLICATION/WINDOW AWARE IMAGE CACHING SYSTEM

BACKGROUND

In a virtual desktop infrastructure environment, a framebuffer encoding system is used to prepare images for display. An agent program at a remote desktop/server retrieves framebuffer image data and encodes the image data into bitstream to send to a client device. The client device decodes the framebuffer image data and renders the image data in the client display system. The agent program could detect the changed area of the framebuffer by comparing with the last frame and encoding only the updated area. The updated area is generally block/slice aligned, so the encoded area tends to be a little larger than the updated area. The client does not know the exact updated area and draws the whole updated area in the client display system. Therefore, a larger amount of data is transmitted from the server to the client than is necessary to only update the updated area of the image, and more computing power is used at the client device than necessary to render only the updated area of the image.

SUMMARY

One or more embodiments provide techniques for image caching in virtual environments. A method for image caching includes detecting an updated image in a framebuffer at a server. The method also includes creating a first hash value associated with the updated image and using the first hash value as a key to perform a lookup in a first hash table. If no entry in the first hash table matches the first hash value, the method creates an entry for the first hash value in the first hash value, creates a second hash table associated with the first hash value, adds an image content hash of the updated image to the second hash table, and transmits the first hash value and the updated image to a client. If an entry in the first hash table matches the first hash value, the method includes calculating an image content hash for the updated image and using the image content hash to perform a lookup in the second hash table associated with the first hash value. If the image content hash is not found in the second hash table, the method includes adding the image content hash an entry in the second hash table and transmitting the first hash value and the updated image to the client. If the updated image is found in the second hash table, the method includes transmitting the first hash value and the image content hash to the client without transmitting the updated image to the client.

According to another embodiment, a non-transitory computer-readable storage medium contains a program which, when executed by one or more processors, performs operations for image caching in virtual environments as set forth above.

According to yet another embodiment, a system includes a processor and a memory, wherein the memory includes a program executable in the processor to perform operations for image caching in a virtual environment as set forth above.

DETAILED DESCRIPTION

Embodiments described herein provide a method for caching images in a virtual desktop environment (e.g., VDI, DAAS, etc.) by using hash tables to store information about an application or window and position and size information in order to store updated images. Many application windows have a limited number of possible display statuses, which can be selected based on user input. For example, a desktop application may contain a toolbar displaying several menu options, which can be selected by the user to place the application in a different display status. A user input operation may cause a change in display status which updates one or more areas of the user interface of the application. Such updated areas of applications or windows are often fixed relative to the window in terms of size and position. In virtual desktop environments, information about the size and position of the areas updated by display status changes can be used to improve the caching of display updates transmitted from the server to a client. For example, hash tables which are based on information that includes the position and size of updated areas of the application windows are used on an agent side and a client side to track previous image updates. When an updated area of an image is determined to be already stored in a cache (by using a hash based on the size/position of the updated area), the agent side can transmit a hash identifying the image to the client side, and the client side can update the display with the cached image.

Reference will now be made in detail to several embodiments, examples of which are illustrated in the accompanying figures. The figures depict embodiments for purposes of illustration only. One skilled in the art will readily recognize from the following description that alternative embodiments of the structures and method illustrated herein may be employed without departing from the principles described herein.

Figure 1:
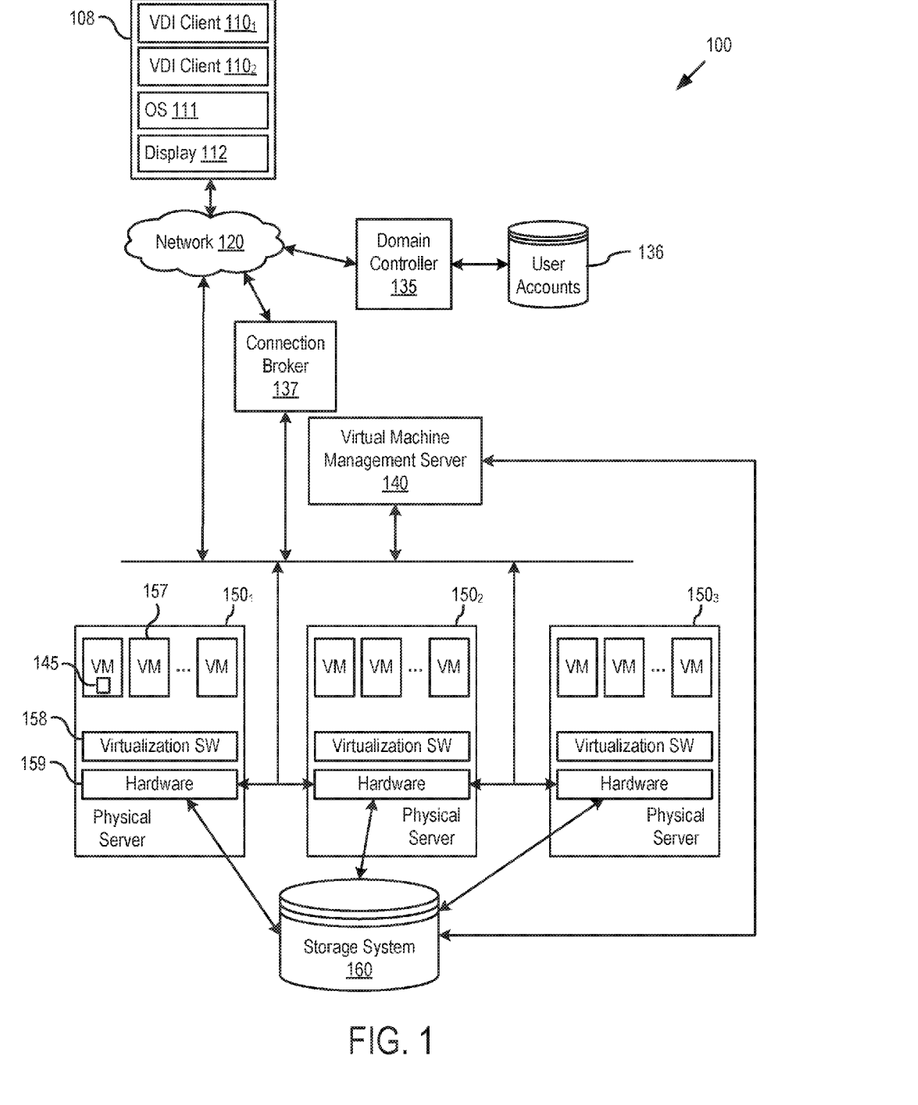
FIG. 1 is a block diagram that illustrates a computing system in accordance with one embodiment.

FIG. 1 illustrates components of a virtualized desktop infrastructure (VDI) system 100 in which one or more embodiments of the present invention may be implemented. In VDI system 100, VDI client software programs (also referred to as "VDI clients" for short), e.g., VDI clients 110$_{1-2}$, run on operating systems of local computing devices, e.g., client machine 108 on top of an operating system (OS) 111. Client machine 108 also comprises a display 112. VDI clients provides an interface for the users to access their desktops, which may be running in one of virtual machines 157 or blade server (not shown) in a data center that is remote from the user locations. With VDI clients, users can access desktops running in a remote data center through network 120, from any location, using a general purpose computer running a commodity operating system and a VDI client software program such as VMware® View™, or a special purpose thin client such as those available from Dell, HP, NEC, Sun Microsystems, Wyse, and others.

VDI system 100 includes a domain controller 135, such as Microsoft® Active Directory®, that manages user accounts 136 including user log-in information, and a connection broker 137 that manages connections between VDI clients and desktops running in virtual machines 157 or other platforms. Domain controller 135 and connection broker 137 may run on separate servers or in separate virtual machines running on the same server or different servers. In the embodiments of the present invention illustrated herein, desktops are running in virtual machines 157 which are instantiated on a plurality of physical computers 150, 152, 154, each of which includes virtualization software 158 and hardware 159 (CPU(s), memory, storage, etc.), is controlled by a virtual machine management server 140, and is coupled to a shared persistent storage system 160. An agent program 145 detects framebuffer updates, retrieves framebuffer image data, and encodes the image data to send to a client 110. Each virtual machine 157 has an associated agent program 145.

In one embodiment, VDI systems obtain information about an application, such as window position, z-order, and application name. This information can be used by embodiments described herein to reduce computing and bandwidth usage in an image caching system. For user interface (UI) widgets or other applications, a toolbar, menu, status bar, button, and size or position relative to the window are fixed for many cases. Therefore the display status of the widget may comprise a relatively small number of instances. An image cache for each display status of each widget can make a cache easier to hit than a block based image cache. A multi-tier image cache system can reduce computing power usage and network bandwidth usage in accordance with the embodiments described herein. The embodiments described herein can also be used with Desktop-as-a-Service (DAAS) systems, application remoting systems, and the like.

Figure 2A:
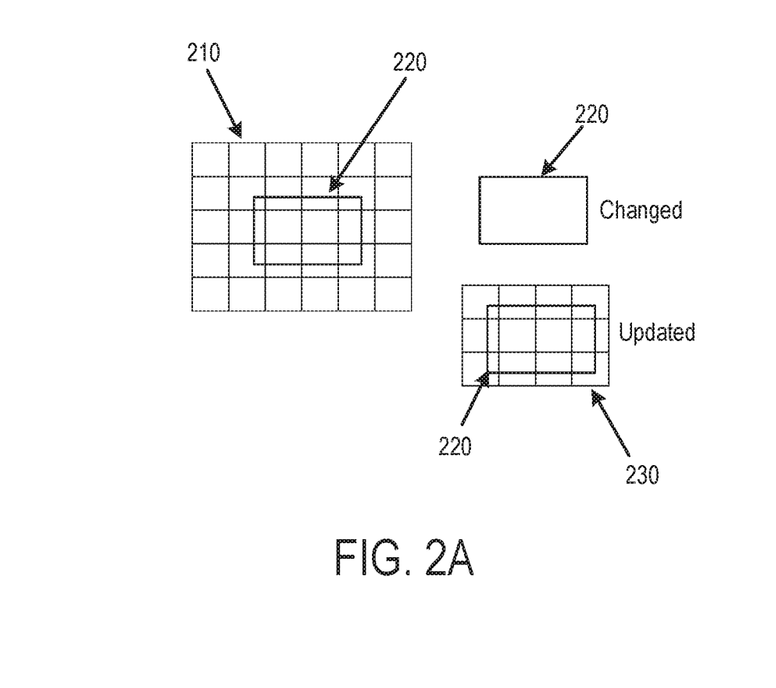
FIGS. 2A and 2B illustrate example display updates according to an embodiment.
Figure 2B:
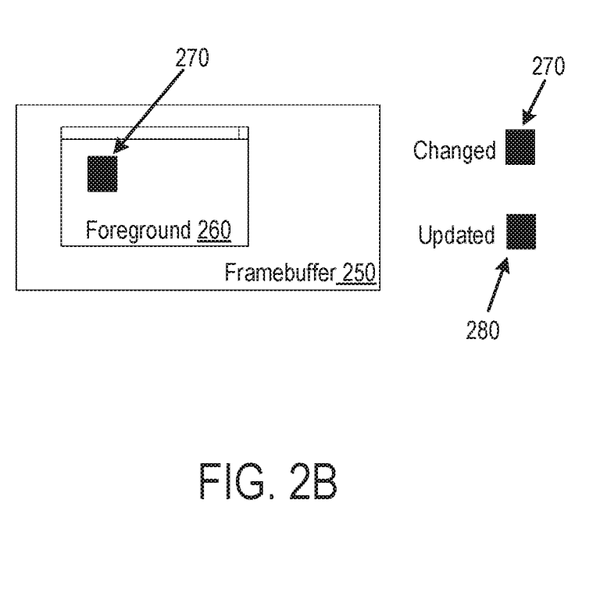

FIGS. 2A and 2B illustrate an example traditional framebuffer encoding system and an example framebuffer encoding system according to embodiments described herein. A framebuffer is associated with display 112. The traditional encoding system comprises framebuffer 210. An agent program in a remote desktop or server retrieves the framebuffer image data and renders the image data in a client display system. The agent detects the changed area 220 of the framebuffer 210 by comparing the current frame with the last frame and only encodes the updated area 230. The updated area in the framebuffer 210 is block/slice aligned so the encoded or updated area 230 is a little larger than the changed area 220. The updated area 230 is sent to the client. The client, however, does not have knowledge of the exact changed area 220 and therefore draws the whole updated area 230 in the client display system. As shown, this can result in using more computing power or networking bandwidth than if only the changed area 220 were sent to the client.

An encoding system according to an embodiment herein is illustrated in FIG. 2B and comprises framebuffer 250. Illustrated in framebuffer 250 is foreground window 260. A changed area 270 of foreground window 260 is also illustrated. In this caching system, the agent detects the changed area 270 and only information identifying the changed area 270 is transmitted to the client. The changed area 270 is the same as the updated area 280 in this example. As described in further detail below, the client updates a smaller portion of the display than in the traditional method.

Figure 3:
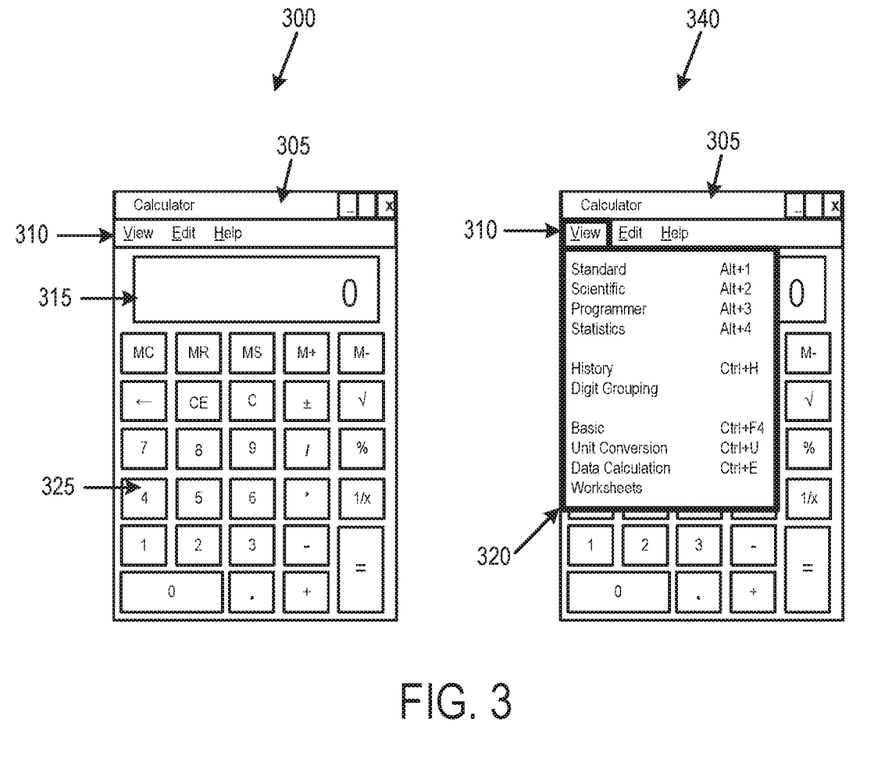
FIG. 3 illustrates example user interface widgets according to an embodiment.

FIG. 3 illustrates example views of UI widgets according to one embodiment. These views are examples of what the calculator program looks like when displayed on display 112 of client device 108. Two views of the calculator are illustrated in FIG. 3 (views 300 and 340). The first view, 300, illustrates a view of the calculator when the program is first opened on client device 108. The title bar 305 says "Calculator" on the left edge and displays 3 buttons on the right edge (commonly known as the minimize, maximize, and close buttons).

Also illustrated in view 300 are menus 310. The menus include the View, Edit, and Help menus. Display 315 is also shown, as are buttons 325. As noted above, the size and position relative to the application window of many of these items are fixed for many cases. For example, the title bar 305 is always above the menus 310, which are above display 315. If the entire application moves to another portion of the display (for example, if the user clicks-and-drags the calculator to another location on the display), the size and relative position of the title bar 305, menus 310, etc., remain the same. As another example, if the user types numbers on a keypad to perform calculations with the calculator, only the display 315 changes—the buttons 325, title bar 305, etc., remain the same. In embodiments described herein, the different display statuses of the widget are stored in an image cache that can be easier to hit than a block-based image cache.

FIG. 3 also illustrates view 340 of the calculator. In view 340, the user has selected the View menu, and the View menu opens (or drops down) to show the options available under that menu. The View menu options are illustrated as component 320, with a highlighted box around the options. The action of opening the View menu produces another display status of the widget. This display status can also be stored in the image cache. In many instances, the image displayed within the borders of the calculator window (such as view 340) will be the same each time a user selects the View menu. The portions of the calculator image 340 outside of box 320 may not need to be updated when the portions of the image inside of box 320 are updated. For example, when the user selects the View menu to open, the title bar 305 does not need to be updated. Therefore, a more efficient caching system can be implemented using that information.

Figure 4A:
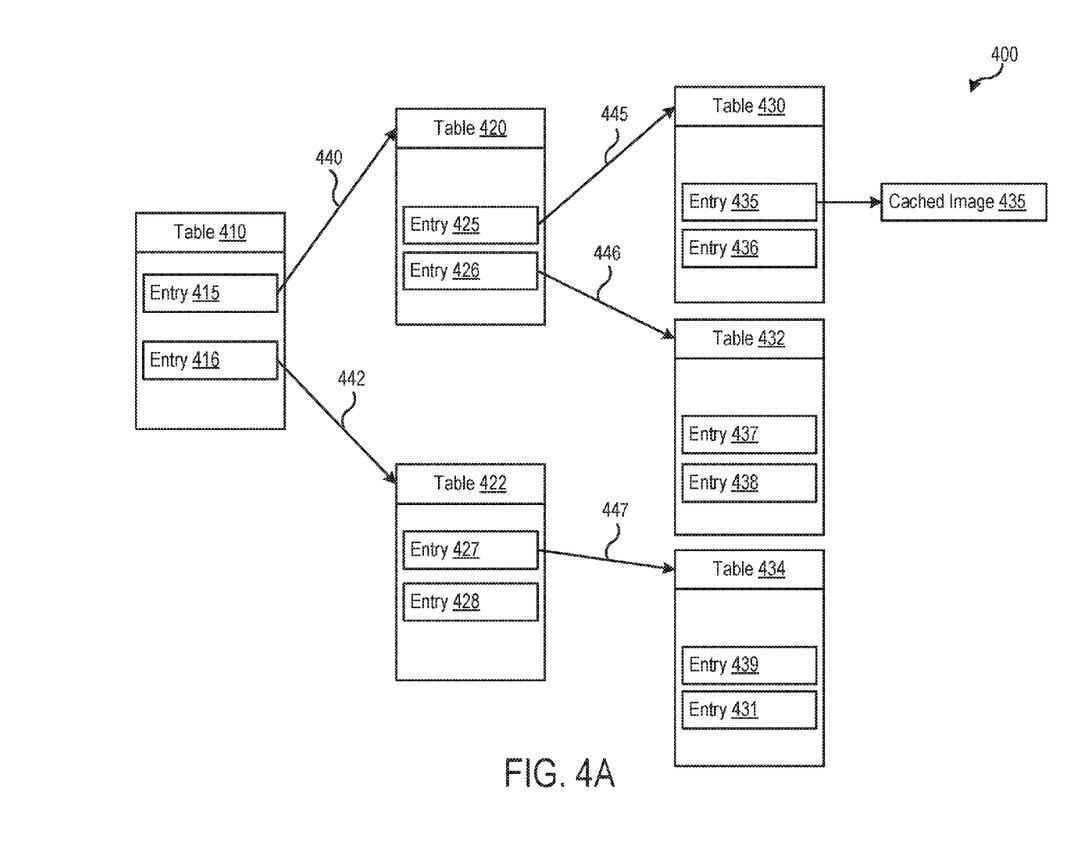
FIGS. 4A and 4B illustrate example caching systems according to an embodiment.

FIG. 4A illustrates the data structures of the cache system 400 according to an embodiment. A cache system is set up on both the client side and the agent side for each application or window. FIG. 4A illustrates the cache system 400 on the agent side. An application/window table 410 is created that tracks the applications/windows with entries 415, 416, etc., for each application or window. Two entries are shown here as an example, but table 410 may contain any number of entries. When an updated image occurs, a hash value 440, 442, etc., of the position/size of the updated image is used to lookup the position/size hash tables 420, 422, as discussed in further detail below, to see if an updated image has occurred for that particular application window in that same position/size before. The cache system further comprises image content hash tables 430, 432, and 434 in this example, which are also discussed in further detail below. When a new application or window is opened, a new entry is created in table 410 for that application/window and stored in table 410. When a new window is opened or a background window becomes the foreground window, all other areas outside of that window are treated as background.

FIG. 4A further illustrates the position/size hash tables 420 and 422, which each have one or more entries as illustrated. A separate position/size hash table 420, 422, etc. is created for each application or window entry in table 410. As shown, the entry for one window 415 in table 410 points to position/size hash table 420, which contains hash values based on all the position/size of updates that have occurred in the past within that one window. The entry for another window 416 in table 410 points to position/size hash table 422, which contains the position/size hash values of updates that occurred within that other window. In this example, two entries are shown in table 410 so two windows have been opened within the virtual desktop interface. Because the number of positions/sizes of updates within an application or window is generally a reasonably finite number, the systems described herein can be created without a large allocation of memory resources. The position/size hash tables 420 and 422 store position/size entries 425, 426, 427, and 428 as illustrated in this example. Of course, the position/size hash tables may store any number of entries; two are illustrated in each table as an example herein. Each position/size entry 425-428 is associated with a particular position/size of the associated update within the application or window represented by individual entries from table 410. For example, entries 425 and 426 are particular position/sizes of the updates that occurred within the application window associated with entry 415.

The position/size entries 425-428 are hash values associated with a particular position/size of the updated image portion of the application or window identified by the entry in table 410. Agent program 145 can compute a hash value associated with each position/size, so when an updated image with a particular position/size occurs for an application, the hash values 440, 442 are used to determine if an update has occurred with that particular position/size yet by comparing the hash values 440, 442 to the entries 425-428 in the associated position/size hash table 420. This process is discussed in further detail below.

FIG. 4A also illustrates image content hash tables 430, 432, and 434. For each position/size hash entry in position/size hash tables 420 and 422, an image content hash table is created. In this example, three image content hash tables 430, 432, and 434 are illustrated. Entry 425 in table 420 is associated with image content hash table 430. Entry 426 in table 420 is associated with image content hash table 432. Entry 427 in table 422 is associated with image content hash table 434. An image content hash table may also be associated with entry 428 in table 422, but is not shown in this example for simplicity. The image content hash table stores a hash value for that updated image. These entries are illustrated as entries 435, 436, 437, 438, 439, and 431. These entries comprise an image content hash value. One cached image associated with entry 435 is illustrated in this example. Hash values (445, 446, and 447) associated with the updated image are generated by agent program 145 and used to lookup the image content hash tables 430, 432, 434, etc., to see if that updated image is stored in the cache. This process is discussed in further detail below. Agent program 145 also encodes updated images and sends them to the client.

Figure 4B:
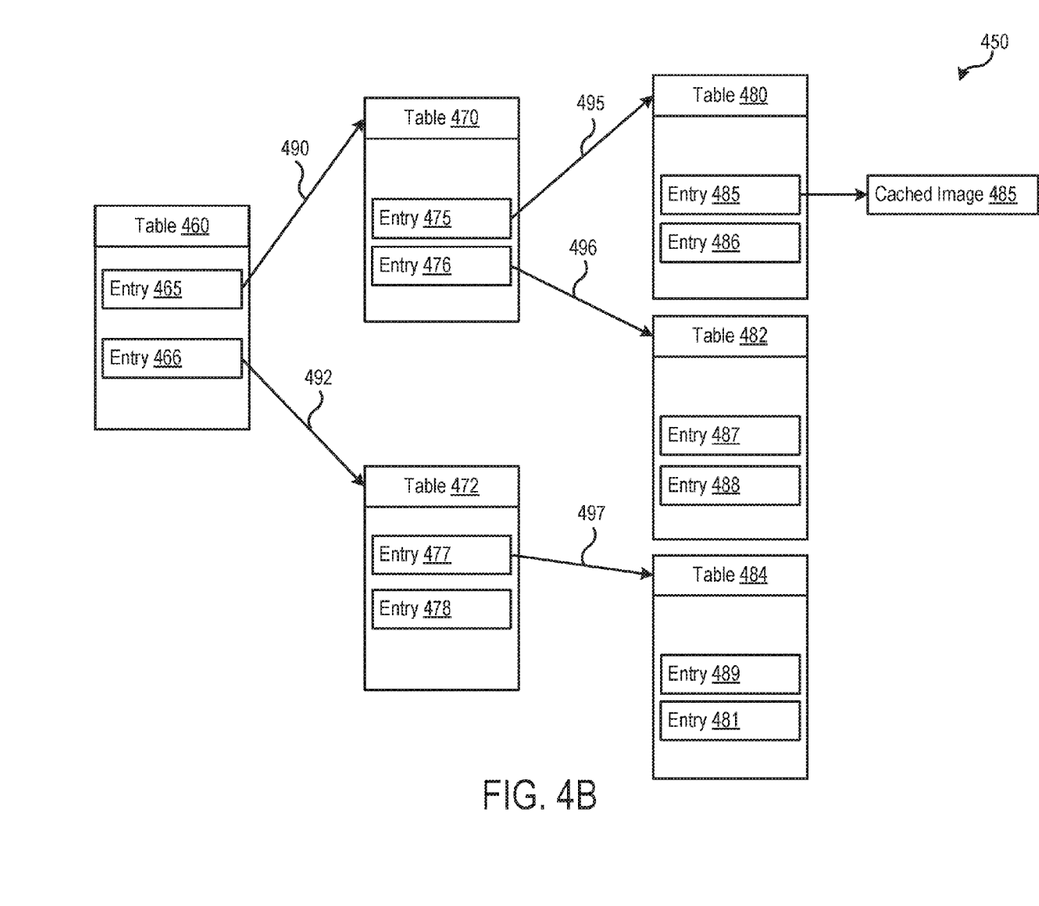

FIG. 4B illustrates the data structures of the cache system 450 on the client side according to an embodiment. A cache system is set up on both the client side and the agent side for each application or window. The operation and structure of the cache system 450 on the client side is similar to the cache system 400 on the agent side. The entries and hash values on the client side are similar so that the client side can update the images on the display as directed by the agent program 145.

An application/window table 460 tracks the applications/windows with entries 465, 466, etc., for each application or window. Two entries are shown here as an example, but table 460 may contain any number of entries. When an updated image occurs, a hash value 490, 492, etc., of the position/size of the updated image is used to lookup the position/size hash tables 470, 472, as discussed in further detail below. The cache system further comprises image content hash tables 480, 482, and 484 in this example, which are also discussed in further detail below. When a new application or window is opened, a new entry is created in table 460 for that application/window and stored in table 460.

FIG. 4B further illustrates the position/size hash tables 470 and 472, which each have one or more entries as illustrated (475, 476, 477, and 478). These position/size hash tables are structured and operate similarly to the position/size hash tables 420 and 422 illustrated above with respect to FIG. 4A.

FIG. 4B also illustrates image content hash tables 480, 482, and 484. These image content hash tables comprise entries 485, 486, 487, 488, 489, and 481 as shown. These image content hash tables are structured and operate similarly to the image content hash tables 430, 432, and 434 illustrated above with respect to FIG. 4A. Hash values 490, 492, 495, 496, and 497 also operate similarly to the respective hash values illustrated in FIG. 4A. One cached image associated with entry 485 is illustrated in this example in FIG. 4B.

Figure 5:
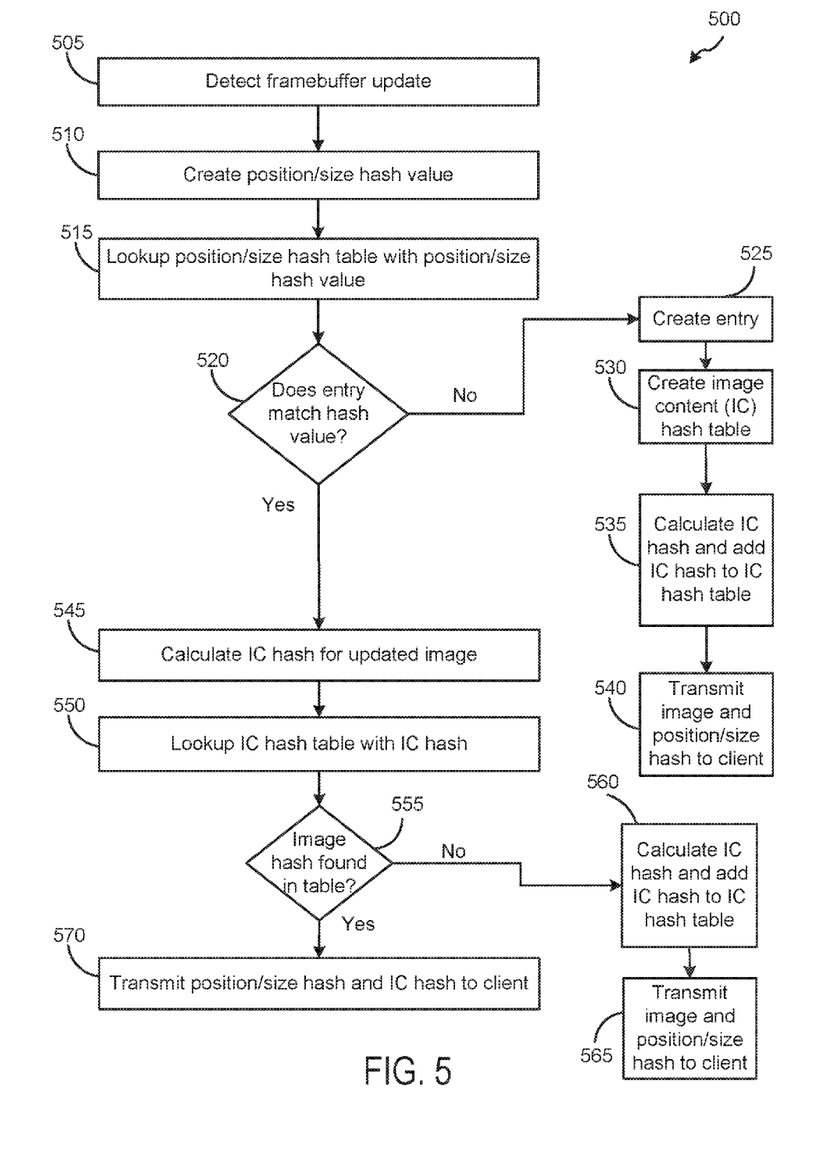
FIG. 5 is a flow diagram that illustrates a method of caching images in a virtual environment.

FIG. 5 is a flow diagram that illustrates a method of caching images in a virtual environment. Although the method steps are described in conjunction with the systems of FIGS. 1-4, persons skilled in the art will understand that any system configured to perform the method steps, in any order, falls within the scope of the present invention. In various embodiments, the hardware and/or software elements described above in FIGS. 1-4 can be configured to perform the method steps of FIG. 5. FIG. 5 illustrates the steps performed on the agent side, in conjunction with the data structures described with respect to FIG. 4A above.

As shown, a method 500 begins at step 505 where agent program 145 detects an updated image in a framebuffer at a server. A cache system is set up on both client side and agent side for each application/window. If the update is not in a foreground application/window, or is not in a suitable area of the foreground application/window, image updates can be encoded and transmitted using a traditional method.

If the update occurs in a suitable area of a foreground application/window, the method proceeds to step 510. Agent program 145 creates a hash value of the position and size of the updated image. Each position/size combination of the updated image has a unique hash value. Examples of these hash values are illustrated as hash values 440 and 442 in FIG. 4A.

The method proceeds to step 515, where the hash value created in step 510 is used as a key to perform a lookup in the application/window-related position/size hash table (i.e., table 420 or 422). On the server side, a position/size hash table 420, 422 is created for each application or window. The position/size hash table 420 comprises entries 425-428, etc., for each position/size within an application/window where an image update has occurred. The entries 425-428 comprise hash values.

At step 520, agent program 145 determines if the hash value created in step 510 matches an entry in the position/size hash table 420. If the hash value does not find an entry, the method proceeds to step 525. Not finding an entry in the position/size hash table 420 means that the specific position/size of the updated image has not yet been associated with a framebuffer update. In this case, agent program 145 creates a new entry for this position/size and stores it in position/size hash table 420 at the server side at step 525.

The method then proceeds to step 530, where agent program 145 creates an image content (IC) hash table 430 at the server side to be associated with the new position/size entry created in step 525. Agent program 145 calculates an image content hash, such as image content hash 445, 446, or 447 for the updated image and adds the image content hash to the image content hash table 430 at step 535.

Figure 6A:
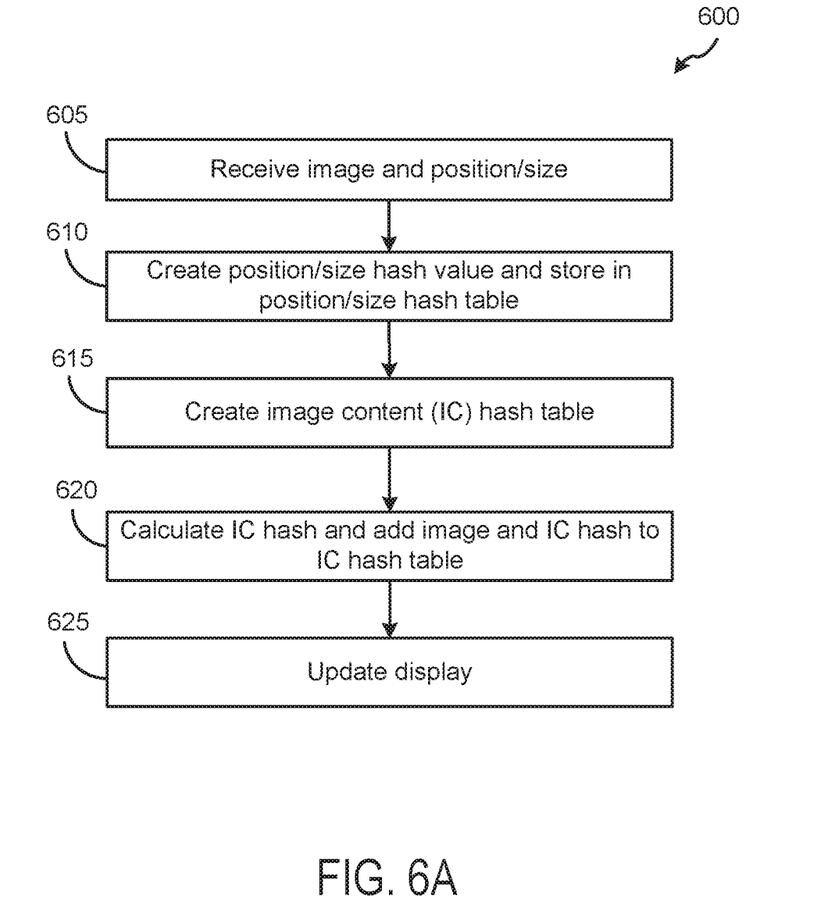
FIGS. 6A-6C are flow diagrams that illustrate methods of caching images in a virtual environment.

Now that the updated image is stored in the cache at the server side, agent program 145 transmits the image to the client as recited at step 540. To transmit the image, agent program 145 encodes the updated images and transmits the image with the position/size hash value to the client. FIG. 6 below describes the processes on the client side.

Referring back to step 520, agent program 145 determines if the hash value created in step 510 matches an entry in the position/size hash table 420. If the hash value matches an entry in the position/size hash table 420, the method proceeds to step 545. Because an entry matched the hash value, image content hash table 430 associated with this position/size has already been created in a previous iteration of the method and does not have to be created here.

At step 545, agent program 145 calculates the image content hash of the updated image, such as IC hash 445, 446, or 447. The method proceeds to step 550, where agent program 145 uses the image content hash 445, 446, 447, etc., to perform a lookup in the image content hash table 430, 432, 434, etc., associated with the position/size entry 425 in the position/size hash table 420.

At step 555, another decision is made by agent program 145 to determine whether the image content hash 445 calculated for the updated image matches an entry in the image content hash table associated with this position/size (in this example, table 430). If the image content hash 445 does not match, the method proceeds to step 560. At step 560, the agent program 145 calculates the image content hash and adds the image content hash into the image content hash table 430. The updated image is then stored in cache on the server side.

The method proceeds to step 565, where agent program 145 transmits the image to the client. Agent program 145 encodes the updated image and transmits the updated image with the position/size hash value (e.g., hash value 440) to the client. The process on the client side is discussed below with respect to FIG. 6. With the position/size hash value, the client can find the related image content hash table stored on the client side and add the updated image to the image content hash table. The client can also create the hash value for the updated image.

Referring back to step 555, agent program 145 determines whether the image content hash (e.g., 445) calculated for the updated image matches an entry in the image content hash table (e.g., 430). If the image content hash matches, this is a cache hit. The image is therefore already stored in cache at both the server side and the client side. Therefore, the image does not need to be transmitted again to the client.

The method proceeds to step 570. At step 570, agent program 145 transmits the position/size hash value (e.g., 440) and the image content hash value (e.g., 445) to the client without transmitting the updated image to the client. The client uses these hash values to find the correct image content hash table on the client side and the cached image stored in the cache on the client side and identified by the image content hash value 445. The client updates the display of the client device with the updated image.

Figure 6B:
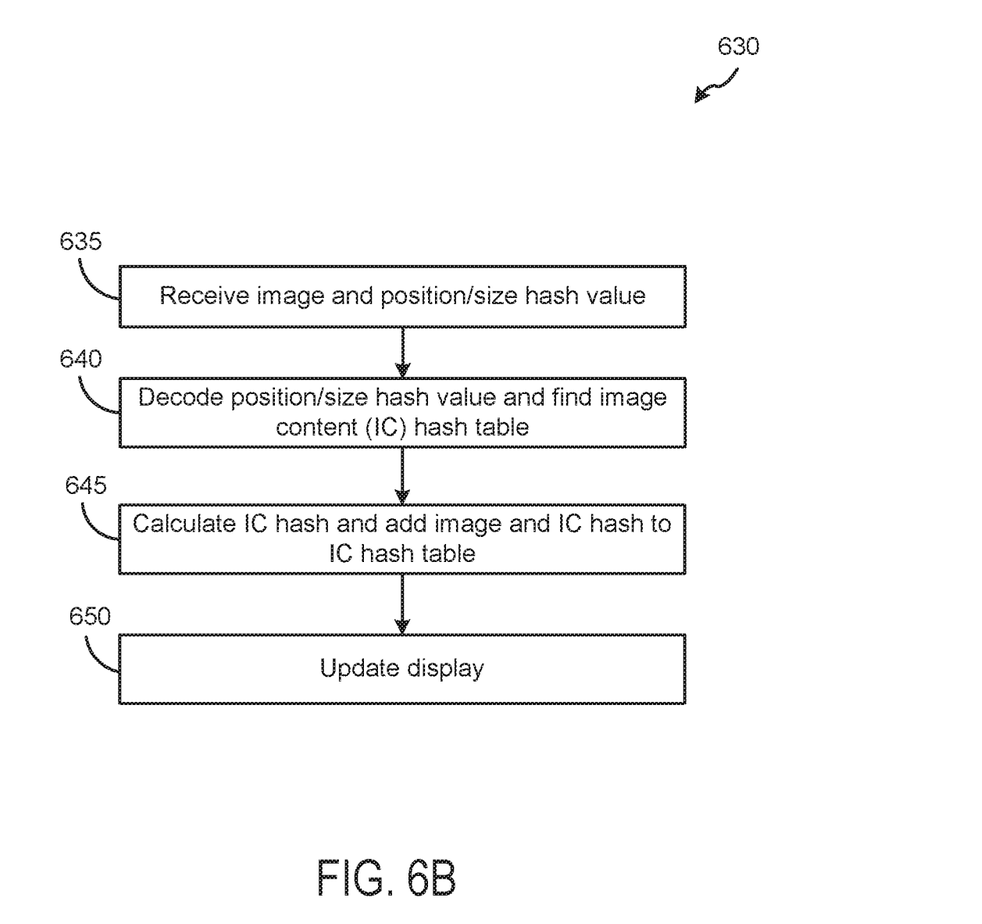
Figure 6C:
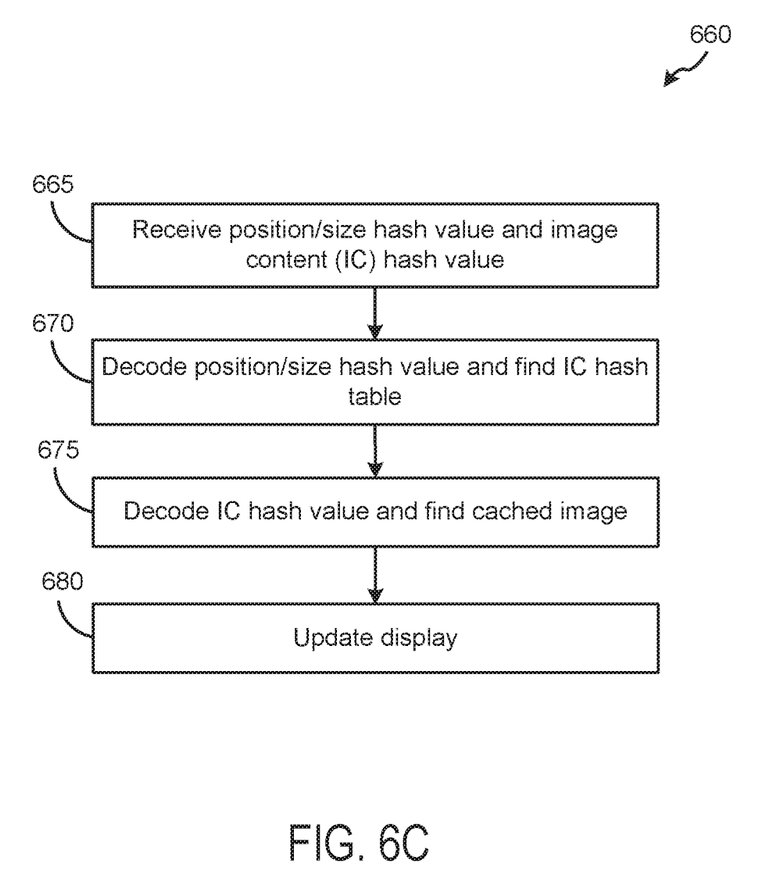

FIGS. 6A-6C are flow diagrams that illustrate methods of caching images in a virtual environment. Although the method steps are described in conjunction with the systems of FIGS. 1-4, persons skilled in the art will understand that any system configured to perform the method steps, in any order, falls within the scope of the present invention. In various embodiments, the hardware and/or software elements described above in FIGS. 1-4 can be configured to perform the method steps of FIGS. 6A-6C. FIGS. 6A-6C illustrates the steps performed on the client side, in conjunction with the data structures described with respect to FIG. 4B above.

As shown, a method 600 begins at step 605 where a client receives an updated image and a position/size associated with the updated image. As noted above, this occurs after step 540 of FIG. 5, when agent program 145 transmits the image and the position/size to the client. In that branch of the method described in FIG. 5, no entry in the position/size hash table (420) matched the position/size hash associated with the updated image. After updating the hash tables and the cache on the server side, agent program 145 transmitted the image and the position/size to the client, where the image and position/size are received by the client in step 605.

At step 610, the client generates a position/size hash value from the position/size information, and stores it in the position/size hash table on the client side. As an example, the hash value 490 in FIG. 4B is generated and stored in table 470, at an entry such as entry 475 or 476. The client uses the same algorithm as the agent program 145, and therefore the position/size hash value 490 on the client side is the same as position/size hash value 440 on the agent side.

The method proceeds to step 615, where the client creates an image content hash table. Because this position/size was not found in the position/size hash table on the server side, this position/size has not received an update before the current image update. Therefore, there is not already an image content hash table associated with this position/size. The image content hash table is thus created on both the server side and the client side. As an example, image content hash table 480 is created, as shown in FIG. 4B.

The method proceeds to step 620, where the client generates an image content hash value from the image. This image content hash value will be the same as the image content hash value generated by agent program 145 at step 535 of FIG. 5. The client then adds the image content hash value associated with that image to the image content hash table created at step 615. The image may be decoded by the client if necessary. The image content hash value is stored, for example, in an entry 485 of table 480 illustrated in FIG. 4B.

At step 625, the client updates the display with the image. The image is now stored in cache on the client side, with an associated image content hash value, and future image updates may then retrieve the image from that cache if needed. If that image update is used in the future, agent program 145 does not need to transmit the image to the client again, but can instead transmit the position/size hash value and the image content hash value and the client can retrieve the image from its cache, as discussed below with respect to FIG. 6C. This method may thus result in lower network bandwidth usage.

FIG. 6B illustrates a flow diagram of a method 630 for caching images in a virtual environment. The method 630 begins at step 635, where a client receives an updated image and a position/size hash value associated with the updated image. As noted above, this occurs after step 565 of FIG. 5, when agent program 145 transmits the image and the position/size hash value to the client. In that branch of the method described in FIG. 5, an entry in the position/size hash table (420) matched the position/size hash of associated with the updated image. However, the image content hash value associated with the updated image did not match any image content hash value in the image content hash table. After updating the image content hash table and the cache on the server side, agent program 145 transmitted the image and the position/size hash value to the client, where the image and position/size hash value are received by the client in step 635.

The method proceeds to step 640, where the client decodes the position/size hash value to find the position/size hash value in the position/size hash table on the client side. As an example using the structures illustrated in FIG. 4B, the client would receive the position/size hash value 490 and find the associated entry in table 470 (e.g., entry 475). Because the entry was found in table 470, an image content hash table has already been created for this position/size hash value, such as table 480. The client finds the image content hash table 480 associated with the position/size hash value at step 640.

At step 645, the client generates an image content hash value from the image, such as image content hash value 495. This image content hash value will be the same as the image content hash value generated by agent program 145 at step 560 of FIG. 5. The client then adds the image content hash value associated with that image to the image content hash table created at step 640. The image may be decoded by the client if necessary. The image content hash value is stored, for example, in an entry 485 of table 480 illustrated in FIG. 4B. Note that this entry did not exist in image content hash table 480 before this step, because this particular image update had not already occurred and was not stored in the cache on either the server side or the client side.

At step 650, the client updates the display with the image. The image is now stored in cache on the client side, with an associated image content hash value, and future image updates may then retrieve the image from that cache if needed. If that image update is used in the future, agent program 145 does not need to transmit the image to the client again, but can instead transmit the position/size hash value and the image content hash value and the client can retrieve the image from its cache, as discussed below with respect to FIG. 6C.

FIG. 6C illustrates a flow diagram of a method 660 for caching images in a virtual environment. The method 660 begins at step 665, where a client receives a position/size hash value associated with the updated image and an image content hash value associated with the updated image. As noted above, this occurs after step 570 of FIG. 5, when agent program 145 transmits the position/size hash value and the image content hash value to the client. In that branch of the method described in FIG. 5, an entry in the position/size hash table (420) matched the position/size hash of the application or window associated with the updated image. In addition, an entry in the image content hash table (430) associated with the position/size hash value also matched the image content hash value generated from the updated image. Agent program 145 transmitted the image content hash value and the position/size hash value to the client, where the image content hash value and the position/size hash value are received by the client in step 665. Because the client received the two hash values from agent program 145 and not an updated image, the client is alerted that the image is stored in cache on the client side.

The method proceeds to step 670, where the client decodes the position/size hash value to find the related image content hash table. The image content hash table may be, for example, a table like image content hash table 480 in FIG. 4B. The method then proceeds to step 675, where the client decodes the image content hash value received from agent program 145 and finds the cached image (e.g., cached image 485) in cache. At step 680, the client updates the display with the image from the cache.

As seen in FIG. 6C, when agent program 145 determines the updated image is stored in cache, the agent program 145 only transmits the two hash values to the client without transmitting the updated image to the client. The embodiments described herein therefore reduce network bandwidth usage with the image caching system.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. These embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for caching images in a virtual environment, comprising:
    detecting an updated image in a framebuffer at a server;
    creating a first hash value associated with the updated image;
    using the first hash value as a key to perform a lookup in a first hash table;
    if no entry in the first hash table matches the first hash value:
        creating an entry for the first hash value in the first hash table;
        creating a second hash table associated with the first hash value;
        adding an image content hash of the updated image to the second hash table; and
        transmitting the first hash value and the updated image to a client;
    if an entry in the first hash table matches the first hash value:
        calculating an image content hash for the updated image; and
        using the image content hash to perform a lookup in the second hash table associated with the first hash value;
        if the image content hash is not found in the second hash table:
            adding the image content hash as an entry in the second hash table; and
            transmitting the first hash value and the updated image to the client;
        if the updated image is found in the second hash table:
            transmitting the first hash value and the image content hash value to the client without transmitting the updated image to the client; and
            updating a display at the client with the updated image.

2. The method of claim 1, wherein the first hash value is a hash value associated with the position and size of the updated image.

3. The method of claim 2, wherein the server and the client each have a first hash table.

4. The method of claim 1, wherein after transmitting the first hash value and the updated image to the client:
    creating an entry for the first hash value in a first hash table on a client side;
    creating a second hash table associated with the first hash value on the client side; and
    adding an updated image content hash to the second hash table on the client side.

5. The method of claim 1, wherein after transmitting the first hash value and the image content hash value to the client:
    using the first hash value and the image content hash value to find the updated image in a client cache.

6. The method of claim 5, further comprising updating the display by updating a framebuffer at the client with the updated image.

7. The method of claim 1, wherein the updated image is an updated image of a foreground window.

8. A non-transitory computer-readable storage medium containing a program which, when executed by one or more processors, performs operations for caching images in a virtual environment, the operations comprising:
    detecting an updated image in a framebuffer at a server;
    creating a first hash value associated with the updated image;

using the first hash value as a key to perform a lookup in a first hash table;
if no entry in the first hash table matches the first hash value:
creating an entry for the first hash value in the first hash table;
creating a second hash table associated with the first hash value;
adding an image content hash of the updated image to the second hash table; and
transmitting the first hash value and the updated image to a client;
if an entry in the first hash table matches the first hash value:
calculating an image content hash for the updated image; and
using the image content hash to perform a lookup in the second hash table associated with the first hash value;
if the image content hash is not found in the second hash table:
adding the image content hash as an entry in the second hash table; and
transmitting the first hash value and the updated image to the client;
if the updated image is found in the second hash table:
transmitting the first hash value and the image content hash value to the client without transmitting the updated image to the client; and
updating a display at the client with the updated image.

9. The non-transitory computer-readable storage medium of claim 8, wherein the first hash value is a hash value associated with the position and size of the updated image.

10. The non-transitory computer-readable storage medium of claim 9, wherein the server and the client each have a first hash table.

11. The non-transitory computer-readable storage medium of claim 8, wherein after transmitting the first hash value and the updated image to the client, the operations further comprise:
creating an entry for the first hash value in a first hash table on a client side;
creating a second hash table associated with the first hash value on the client side; and
adding an updated image content hash to the second hash table on the client side.

12. The non-transitory computer-readable storage medium of claim 8, wherein after transmitting the first hash value and the image content hash to the client:
using the first hash value and the image content hash value to find the updated image in a client cache.

13. The non-transitory computer-readable storage medium of claim 12, wherein the operations further comprise updating the display by updating a framebuffer at the client with the updated image.

14. The non-transitory computer-readable storage medium of claim 8, wherein the updated image is an updated image of a foreground window.

15. A system, comprising:
a processor; and
a memory, wherein the memory includes a program executable in the processor to perform operations for caching images in a virtual environment, the operations comprising:
detecting an updated image in a framebuffer at a server;
creating a first hash value associated with the updated image;
using the first hash value as a key to perform a lookup in a first hash table;
if no entry in the first hash table matches the first hash value:
creating an entry for the first hash value in the first hash table;
creating a second hash table associated with the first hash value;
adding an image content hash of the updated image to the second hash table; and
transmitting the first hash value and the updated image to a client;
if an entry in the first hash table matches the first hash value:
calculating an image content hash for the updated image; and
using the image content hash to perform a lookup in the second hash table associated with the first hash value;
if the image content hash is not found in the second hash table:
adding the image content hash as an entry in the second hash table; and
transmitting the first hash value and the updated image to the client;
if the updated image is found in the second hash table:
transmitting the first hash value and the image content hash value to the client without transmitting the updated image to the client; and
updating a display at the client with the updated image.

16. The system of claim 15, wherein the first hash value is a hash value associated with the position and size of the updated image.

17. The system of claim 16, wherein the server and the client each have a first hash table.

18. The system of claim 15, wherein after transmitting the first hash value and the updated image to the client, the operations further comprise:
creating an entry for the first hash value in a first hash table on a client side;
creating a second hash table associated with the first hash value on the client side; and
adding an updated image content hash to the second hash table on the client side.

19. The system of claim 15, wherein after transmitting the first hash value and the image content hash to the client:
using the first hash value and the image content hash value to find the updated image in a client cache.

20. The system of claim 19, wherein the operations further comprise updating the display by updating a framebuffer at the client with the updated image.

* * * * *